United States Patent
Lindberg

(10) Patent No.: US 12,257,926 B2
(45) Date of Patent: Mar. 25, 2025

(54) ELECTRIC MACHINE DRIVE ARRANGEMENT FOR A HEAVY-DUTY VEHICLE

(71) Applicant: Volvo Truck Corporation, Gothenburg (SE)

(72) Inventor: Johan Lindberg, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 18/106,564

(22) Filed: Feb. 7, 2023

(65) Prior Publication Data
US 2023/0278432 A1  Sep. 7, 2023

(30) Foreign Application Priority Data

Mar. 1, 2022 (EP) .................................... 22159365

(51) Int. Cl.
*B60L 7/06* (2006.01)
*B60L 7/26* (2006.01)

(52) U.S. Cl.
CPC ........ *B60L 7/06* (2013.01); *B60L 7/26* (2013.01); *B60L 2200/36* (2013.01); *B60L 2210/12* (2013.01); *B60L 2210/40* (2013.01)

(58) Field of Classification Search
CPC .......... B60L 7/06; B60L 7/26; B60L 2200/36; B60L 2210/12; B60L 2210/40; B60L 3/0084; B60L 3/0092; B60T 2270/60
USPC .......................................... 187/288; 318/758
See application file for complete search history.

(56) References Cited

U.S. PATENT DOCUMENTS

| | | | | |
|---|---|---|---|---|
| 5,070,290 A | * | 12/1991 | Iwasa | ................. B66B 5/02 318/758 |
| 8,247,925 B2 | * | 8/2012 | Kojima | ............ G01R 31/31924 307/103 |
| 2011/0050136 A1 | | 3/2011 | Sumi et al. | |
| 2018/0065489 A1 | * | 3/2018 | Zhou | ................... B60L 3/003 |
| 2018/0134519 A1 | * | 5/2018 | Kattainen | ................ B66B 1/32 |

FOREIGN PATENT DOCUMENTS

| | | |
|---|---|---|
| CN | 214145751 U | 9/2021 |
| EP | 3628530 A1 | 4/2020 |
| WO | 8809584 A1 | 12/1988 |

OTHER PUBLICATIONS

Extended European Search Report for European Patent Application No. 22159365.0, mailed Aug. 31, 2022, 7 pages.

* cited by examiner

*Primary Examiner* — Elim Ortiz
(74) *Attorney, Agent, or Firm* — Withrow & Terranova, PLLC

(57) ABSTRACT

An electric machine drive arrangement for a heavy-duty vehicle. The electric machine drive arrangement comprises an electric machine. The electric machine drive arrangement further comprises a brake arrangement connected to the electric machine. The electric machine drive arrangement further comprises a braking resistor controller configured to control the brake arrangement. The braking resistor controller has a primary power feed connection and a back-up power feed connection. The back-up power feed connection is connected to an alternating current side of the electric machine for the electric machine to supply back-up power to the braking resistor controller.

15 Claims, 8 Drawing Sheets

ELECTRIC MACHINE DRIVE ARRANGEMENT FOR A HEAVY-DUTY VEHICLE

RELATED APPLICATIONS

The present application claims priority to European Patent Application No. 22159365.0, filed on Mar. 1, 2022, and entitled "ELECTRIC MACHINE DRIVE ARRANGEMENT FOR A HEAVY-DUTY VEHICLE," which is incorporated herein by reference in its entirety.

TECHNICAL FIELD

Embodiments presented herein relate to an electric machine drive arrangement for a heavy-duty vehicle. Embodiments presented herein further relate to a vehicle comprising such an electric machine drive arrangement.

BACKGROUND

In general terms, the purpose of a braking resistor is to quickly stop or slow down a mechanical system by producing a braking torque. Commonly, a braking resistor is connected in series with a chopper or with a circuit breaker on the direct current (DC) side of the electric motor drive system (MDS) in vehicles.

FIG. 1 shows an electric machine drive arrangement 100 according to an illustrative example. The electric machine drive arrangement 100 comprises an electric machine 110. The electric angular speed and the alternating current (as measured by an alternating current measurement unit 170) are, together with a (direct current) voltage ($U_{DC}$), provided as input to an electric machine controller 160. The electric machine controller 160 controls a switching pattern of six switches 122 as provided in a motor drive system inverter 120. A brake arrangement 130 comprises a braking resistor 132 connected in series with a direct current chopper 134 and/or a circuit breaker 136. The brake arrangement 130 is controlled by a braking resistor controller 150. The brake arrangement 130, and thus the braking resistor 132, is provided in a parallel circuit to the motor drive system inverter 120 and an electric energy storage system 140 comprising a battery or another type of energy storage circuitry 142.

In general terms, electronic drive units for power electronics are powered from low voltage (LV) power systems and controlled from the vehicle communication system (such as a controller area network (CAN). If the contactors of the electric energy storage system 140 open, the MDS for (propulsion) will go into DC voltage control, maintaining the DC voltage to supply the LV power system from DC/DC converters. This will help to maintain the brake performance of the braking resistor 132, whilst the DC voltage control of the MDS will handle the load rejection caused by the braking resistor requesting active power from the current control of the electric motor. Consequently, the electric motor will provide brake power correspondingly to the power of the braking resistor to maintain the DC voltage.

However, consider a brake scenario where a fault occurs that shuts down the electronic control unit (ECU) of the MDS or the vehicle communication system, or where a loss of LV power to the MDS and the braking resistor controller 150 occurs. This will cause the brake performance of the braking resistor 132 to be lost.

SUMMARY

An object of the embodiments disclosed herein is to address the issues noted above.

A particular object of the embodiments disclosed herein is to provide an electric machine drive arrangement addressing the above issues According to a first aspect, the object is achieved by an electric machine drive arrangement for a heavy-duty vehicle. The electric machine drive arrangement comprises an electric machine. The electric machine drive arrangement further comprises a brake arrangement connected to the electric machine. The electric machine drive arrangement further comprises a braking resistor controller configured to control the brake arrangement. The braking resistor controller has a primary power feed connection and a back-up power feed connection. The back-up power feed connection is connected to an alternating current side of the electric machine for the electric machine to supply back-up power to the braking resistor controller.

According to a second aspect, the object is achieved by a vehicle comprising an electric machine drive arrangement according to the first aspect.

Advantageously, the disclosed electric machine drive arrangement enables the brake performance to be maintained even if the power of the vehicle communication system is lost. This enables the brake arrangement to be controlled independently of the primary low voltage power supply and the communication over the vehicle communication system of the vehicle to maintain brake performance.

According to an embodiment, the back-up power feed connection is connected to the AC side of the electric machine via an auxiliary low voltage power supply interconnected between the AC side of the electric machine and the back-up power feed connection. The auxiliary low voltage power supply comprises a rectifier for rectifying AC voltage supplied from the AC side of the electric machine to a low voltage DC voltage that is provided to the back-up power feed connection. Advantageously, in case of loss of low voltage supply power, this auxiliary low power supply will enable the braking resistor functions to maintain vehicle brake functionality.

According to an embodiment, the electric machine drive arrangement further comprises an electric machine controller configured to control the electric machine, where the electric machine controller comprises a power feed connection connected to the AC side of the electric machine for the electric machine to supply power to the electric machine controller. Advantageously, this enables the auxiliary low power supply to enable the electric machine controller, including power electronic drivers in the inverter, or converter, to maintain its functionality in cases of lost power and/or communication within the vehicle.

Further advantages and advantageous features of the inventive concept are disclosed in the following description and in the dependent claims.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

According to the herein disclosed embodiments there is provided an electric machine drive arrangement for a heavy-duty vehicle addressing the above issues.

Figure 1:
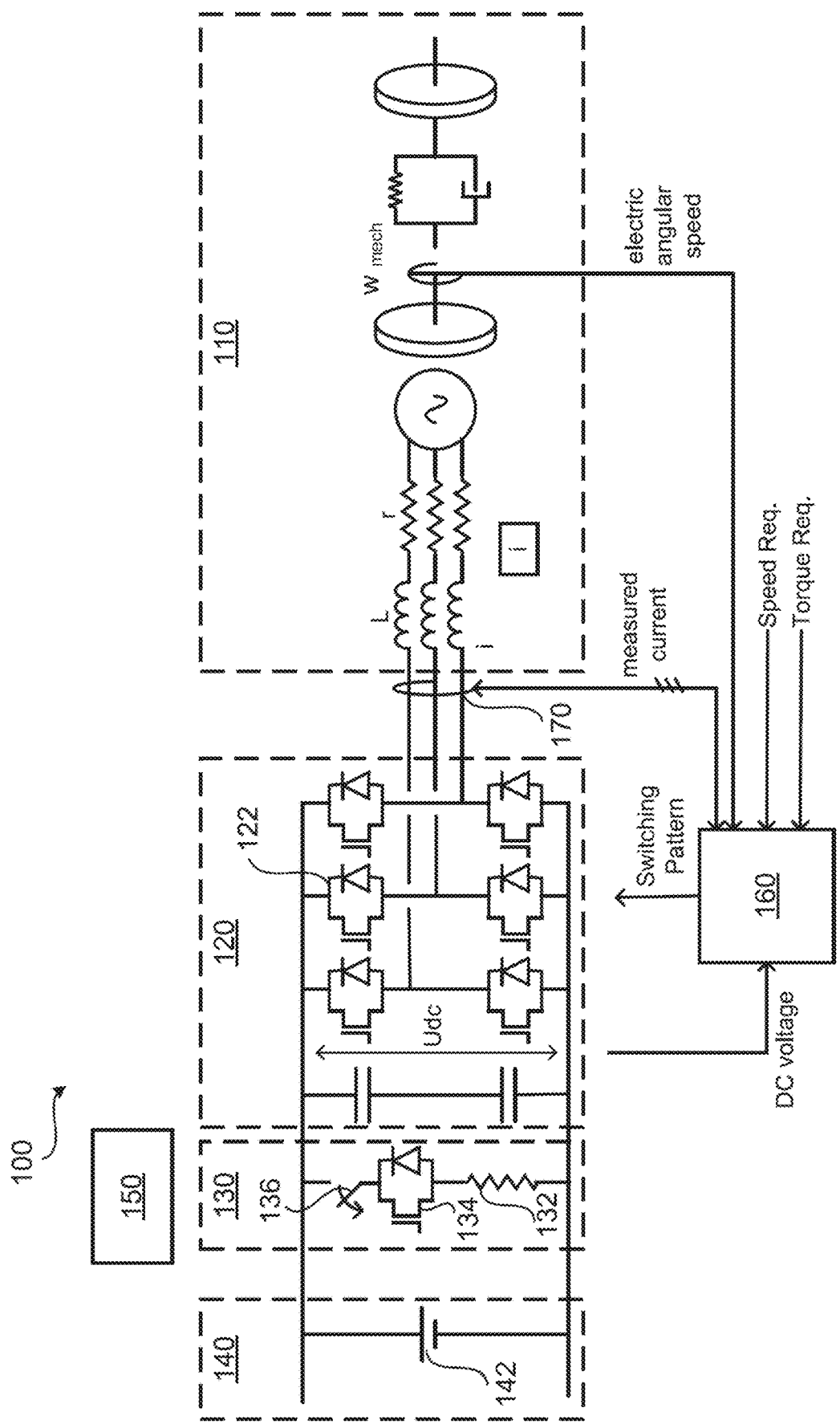
FIG. 1 is a schematic illustration of an electric machine drive arrangement according to prior art.
Figure 2:
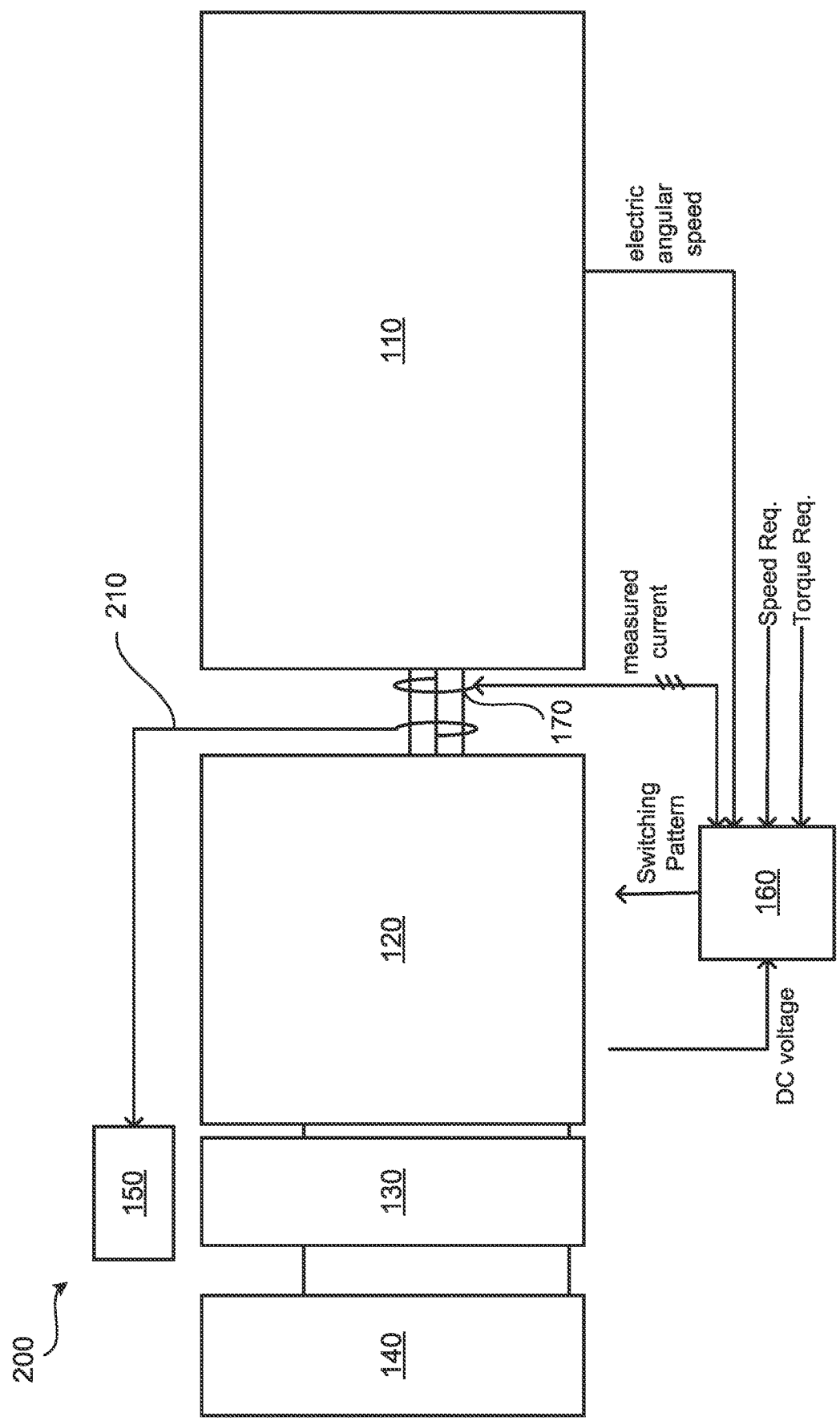
FIGS. 2, 3, 4, 5, 6 are schematic illustration of an electric machine drive arrangement according to embodiments.

FIG. 2 illustrates an electric machine drive arrangement 200 for a heavy-duty vehicle according to a first embodiment.

The electric machine drive arrangement 200 comprises an electric machine 110, a brake arrangement 130, and a braking resistor controller 150. The brake arrangement 130 is connected to the electric machine 110. The braking resistor controller 150 is configured to control the brake arrangement 130. The braking resistor controller 150 has a primary power feed connection (not illustrated in FIG. 2; see FIG. 3) and a back-up power feed connection (not illustrated in FIG. 2; see FIG. 3). The primary power feed connection is connected to a primary low voltage power supply (not illustrated in FIG. 2; see FIG. 6) for the braking resistor controller 150. The back-up power feed connection is, over a connection 210, connected to the AC side of the electric machine 110 for the electric machine 110 to supply back-up power to the braking resistor controller 150.

By means of the back-up power feed being connected to the AC side of the electric machine 110, during (electric) braking, the power generated by the electric machine 110 is supplied to the braking resistor controller 150. According to this embodiment, the brake performance can be maintained even if the power of the vehicle communication system is lost. Hence, the brake arrangement 130 can be controlled independently of the primary low voltage power supply and the communication over the vehicle communication system of the vehicle to maintain brake performance.

FIG. 2 further illustrates additional components of the drive arrangement 200. The electric angular speed and the alternating current (as measured by an alternating current measurement unit 170) are, together with a DC voltage ($U_{DC}$), a speed requirement and a torque requirement provided as input to an electric machine controller 160. The electric machine controller 160 controls a switching pattern of switches as provided in a motor drive system inverter 120. The motor drive system inverter 120 has an AC side for interfacing with the electric machine 110. The brake arrangement 130 is connected in a parallel circuit to the motor drive system inverter 120 and an electric energy storage system 140 on the DC side of the motor drive system inverter 120.

Figure 3:
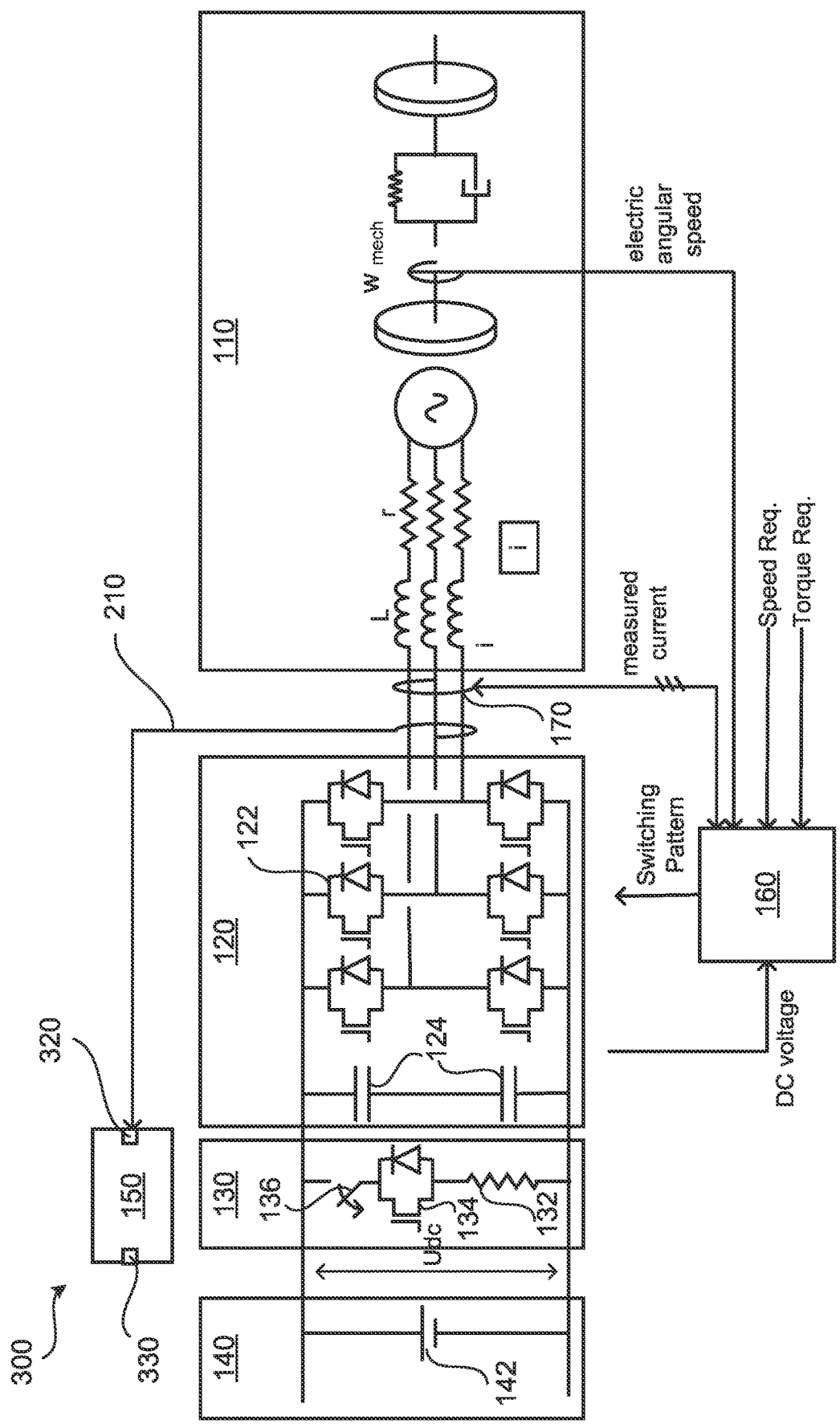

Reference is next made to the electric machine drive arrangement 300 of FIG. 3. The electric machine drive arrangement 300 shows one illustrative realization of the electric machine drive arrangement 200. A repeated description of components already described is omitted for brevity.

FIG. 3 shows the back-up power feed connection 320 provided in the braking resistor controller 150 being connected to the connection 210. FIG. 3 further shows the primary power feed connection 330 in braking resistor controller 150.

Further, in the realization exemplified by the electric machine drive arrangement 300, six switches 122 in addition to two capacitors 124 are provided in the motor drive system inverter 120. In the realization exemplified by the electric machine drive arrangement 300, the electric machine controller 160 controls the switching pattern of the six switches 122. In this respect, the motor drive system inverter 120 can be realized in several ways. In FIG. 3 is illustrated a two-level voltage sources converter. However, the proposed electric machine drive arrangements are not limited to such a topology. The electric machine drive arrangements could be realized using any multi-level configuration and also two-phase and multi-phase electric machines 110 can be applied. Further, in the realization exemplified by the electric machine drive arrangement 300, the energy storage system 140 is provided as a battery another type of energy storage circuitry 142.

In the realization exemplified by the electric machine drive arrangement 300, the brake arrangement 130 comprises a braking resistor circuit 132 realized as a braking resistor. The braking resistor circuit 132 is connected in series with a DC chopper 134 and/or a circuit breaker 136. The braking resistor circuit 132 is thus connectable to a control circuit 134. That is, in the realization exemplified by the electric machine drive arrangement 300, the braking resistor circuit 132 is a braking resistor. However, in other realizations of the electric machine drive arrangement 200, the braking resistor circuit 132 is an electrical motor. The electrical motor is connectable to a mechanical brake circuit.

In the realization exemplified by the electric machine drive arrangement 300, the control circuit 134 is a DC chopper circuit. However, in other realizations of the electric machine drive arrangement 200, the control circuit 134 is a thyristor switch. In further detail, when, for example, considering an electric machine drive arrangement 200 with an asynchronous electric machine 110, the DC chopper circuit can be exchanged with a thyristor switch. The thyristor switch will stop conducting when the current is zero. This is achieved by setting the reactive current in the electric machine controller 160 to zero. By that, the rotor magnetic field will go to zero and the induced voltage will go to zero. By that, the current will be zero.

Figure 4:
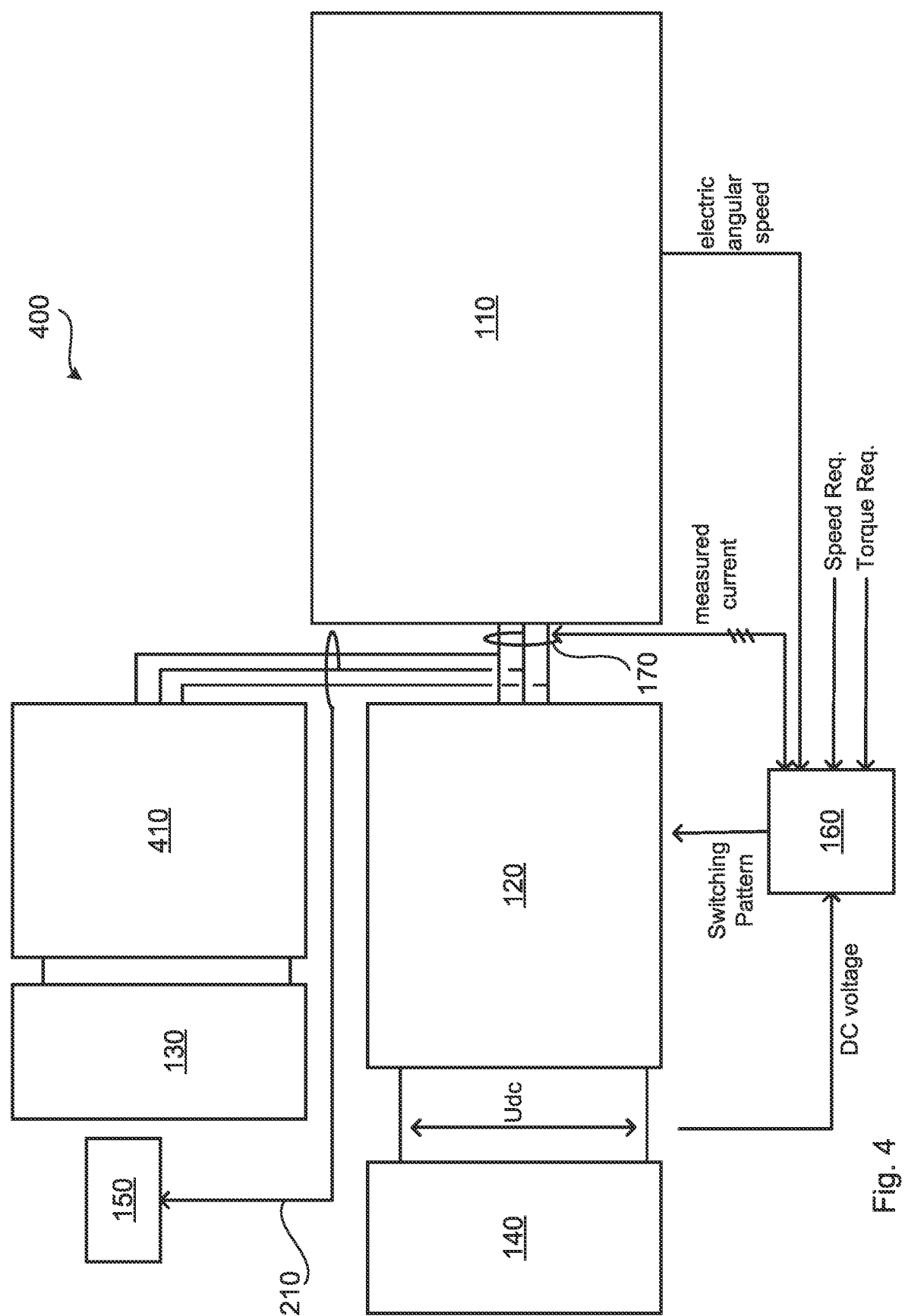

FIG. 4 illustrates an electric machine drive arrangement 400 for a heavy-duty vehicle according to a second embodiment. A repeated description of components already described is omitted for brevity. The electric machine drive arrangement 400 differs from the electric machine drive arrangement 200 in that the electric machine drive arrangement 400 further comprises a rectifier arrangement 410. The rectifier arrangement 410 is connected in parallel between the brake arrangement 130 and the motor drive system inverter 120 on the AC side of the motor drive system inverter 120. Hence, the placement of the brake arrangement 130 is different in the embodiment of FIG. 4 compared to in the embodiment of FIG. 2.

Figure 5:
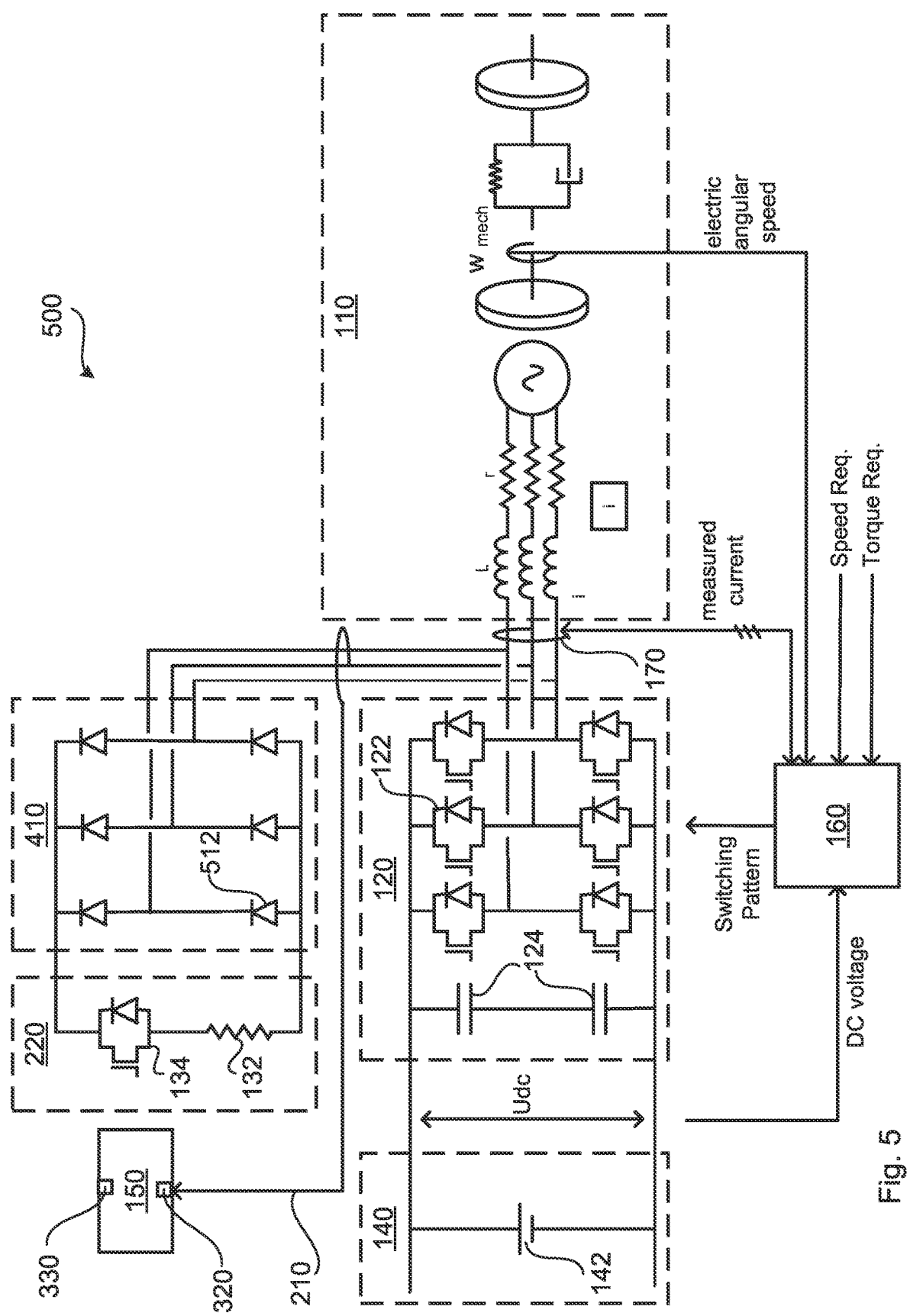

Reference is next made to the electric machine drive arrangement 500 of FIG. 5. The electric machine drive arrangement 500 shows one illustrative realization of the electric machine drive arrangement 400. A repeated description of components already described is omitted for brevity.

In the realization exemplified by the electric machine drive arrangement 500, the rectifier arrangement 410 is a three-phase rectifier composed of diodes 512.

Figure 6:
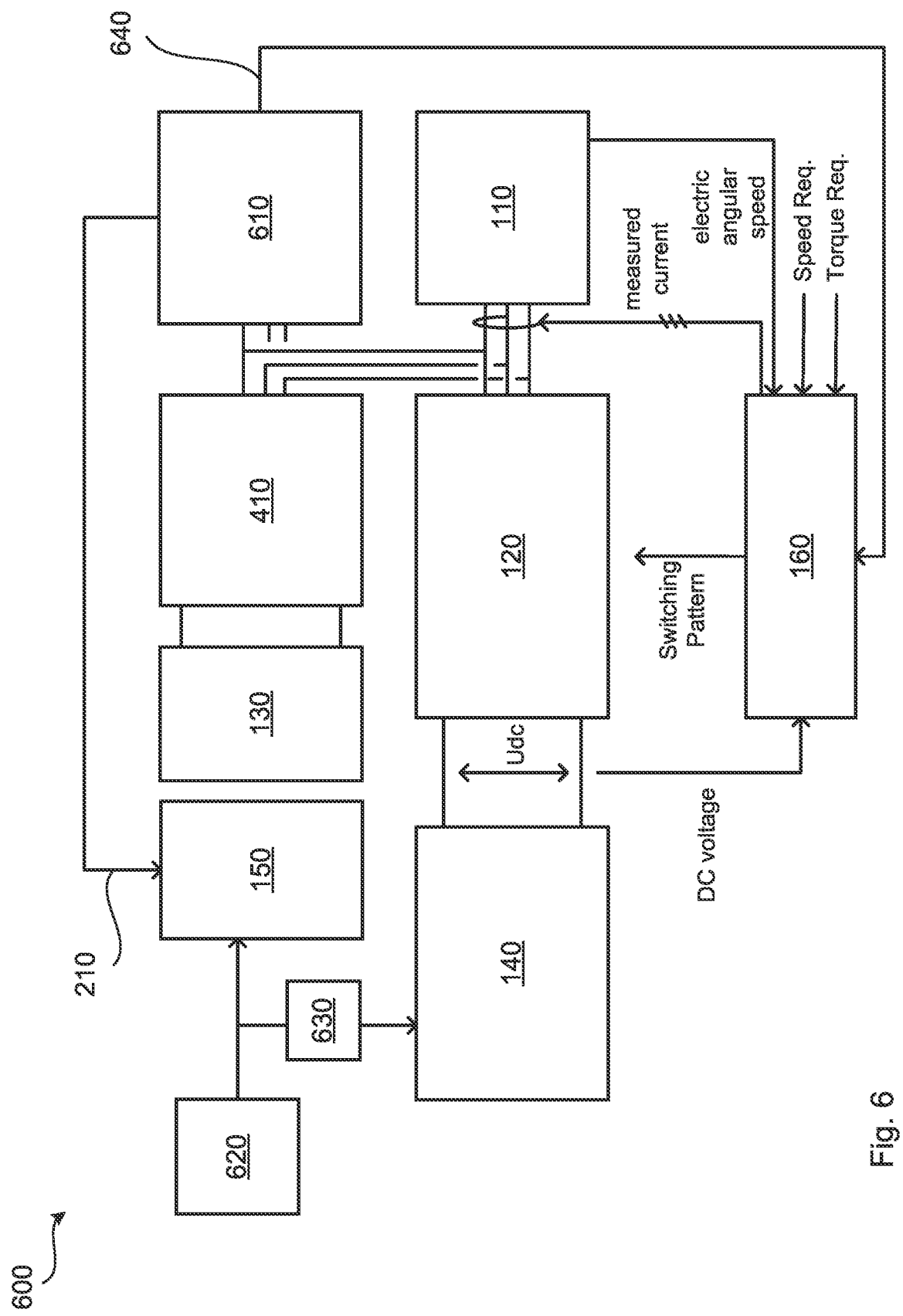

FIG. 6 illustrates an electric machine drive arrangement 600 for a heavy-duty vehicle according to a third embodiment. A repeated description of components already described is omitted for brevity.

In the electric machine drive arrangement 600 (the back-up power feed connection of) the braking resistor controller 150 is connected to the AC side of the electric machine 110 via an auxiliary low voltage power supply 610. The auxiliary low voltage power supply 610 is interconnected between the AC side of the electric machine 110 and (the back-up power feed connection of) the braking resistor controller 150. If the operation of the MDS is blocked due to a fault, the electro-motoric force (EMF) of the electric machine 110 can thereby still provide the AC voltage needed during braking to power the drive units of the braking resistor controller 150.

Further, in FIG. 6 is illustrated the primary low voltage power supply 620 being connected to (the primary power feed connection of) the braking resistor controller 150. The primary low voltage power supply 620 might be connected to the braking resistor controller 150 over the vehicle communication system (not illustrated in FIG. 6). If there is an additional (back-up) power supply from the AC side circuit that powers the ECU to the DC chopper as well as the drive units to the DC chopper, it will become fail-safe if high voltage system is shutting down during braking. Hence, the brake performance of the braking resistor will be maintained. This applies also if the vehicle completely loses low voltage power supply and all ECUs shutdown, or if loss of communication over the vehicle communication system occurs. Hence, the operation of the brake arrangement 130 as controlled by the braking resistor controller 150 is completely unaffected by this.

A DC/DC converter 630 is provided between a high voltage supply (i.e., the electric energy storage system 140) and a low voltage power supply (i.e., the primary low voltage power supply 620), and is arranged to provide power to the low voltage power supply to charge the low voltage energy storage. In addition, the DC/DC converter 630 will supply additional power to the low voltage loads.

Further, in the electric machine drive arrangement 600 the electric machine controller 160 comprises a power feed connection connected, over a connection 210, to the auxiliary low voltage power supply 610 for the auxiliary low voltage power supply 610 to supply power to the electric machine controller 160.

Figure 7:
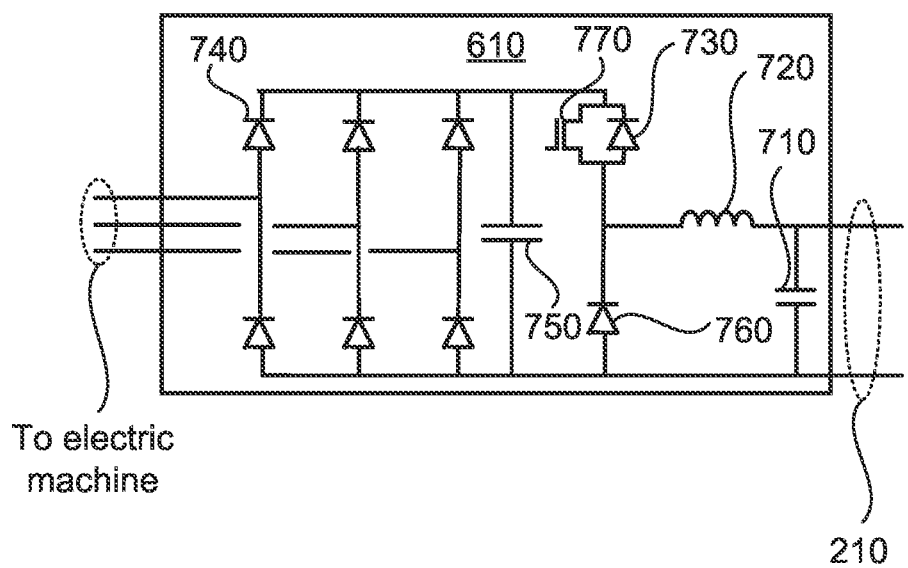
FIG. 7 is a schematic illustration of an alternating current power supply according to an embodiment.

Reference is next made to the auxiliary low voltage power supply 610 of FIG. 7. The auxiliary low voltage power supply 610 shows one illustrative realization of the auxiliary low voltage power supply 610 in FIG. 6.

The auxiliary low voltage power supply 610 comprises a rectifier for rectifying AC voltage supplied from the AC side of the electric machine 110 to a DC voltage that is provided to the back-up power feed connection 320. In the realization of the auxiliary low voltage power supply 610 illustrated in FIG. 7, the rectifier comprises six diodes 740.

The auxiliary low voltage power supply 610 comprises a buck converter 720 for voltage control of the low voltage. The auxiliary low voltage power supply 610 comprises a capacitor 750 arranged for voltage stabilization and/or a low voltage stabilizer 710 as well as for short time low voltage power reserve when the machine speed is low or at stand still, also during anti-lock brake system (ABS) events. Particularly, the capacitor 750 is arranged for mitigating DC voltage ripple and the capacitor 710 is arranged for the auxiliary low voltage power supply 610 to have a stable low voltage supply.

The auxiliary low voltage power supply 610 comprises a DC/DC converter which in FIG. 7 is realized as a buck-converter that consists of an insulated-gate bipolar transistor (IGBT) 770 and diodes 730, 760. The duty cycle of the switching of the IGBT 770 in the buck-converter regulates the low voltage in the auxiliary low voltage power supply 610.

Figure 8:
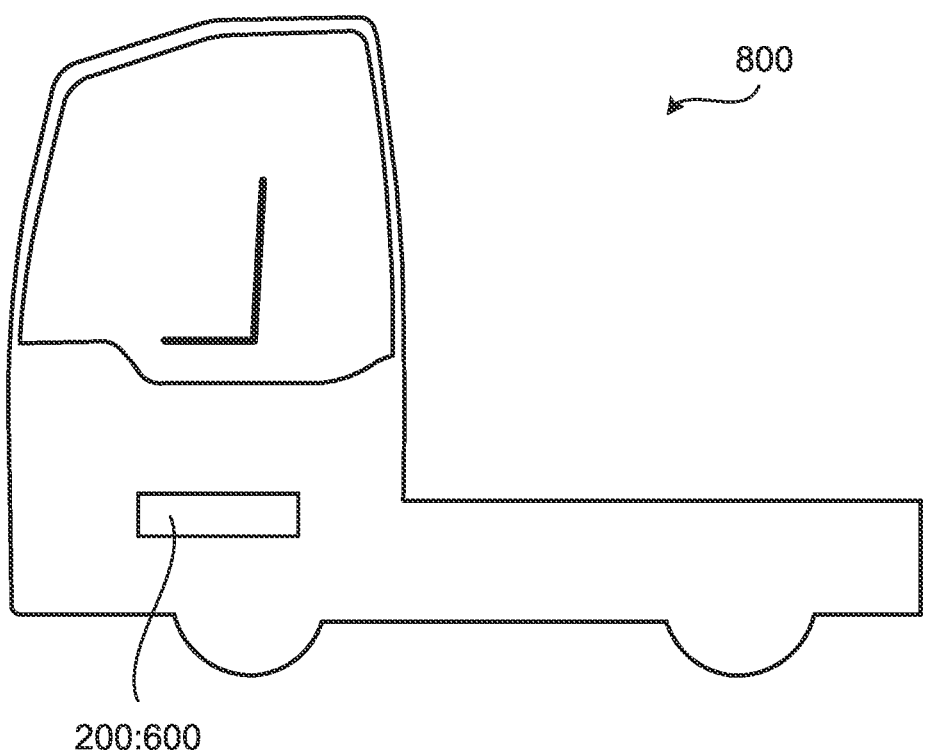
FIG. 8 is a schematic illustration of a vehicle according to an embodiment.

The herein disclosed electric machine drive arrangements 200:600 are suitable for use in a vehicle 800, such as a heavy-duty vehicle. FIG. 8 schematically illustrates a vehicle 800 comprising an electric machine drive arrangement 200:600 as herein disclosed. In some embodiments, the vehicle 800 is a heavy-duty vehicle. In this respect, the present inventive concept is applicable to different types of heavy-duty vehicles 800, such as, but not limited to, trucks, buses and construction equipment.

It is to be understood that the present invention is not limited to the embodiments described above and illustrated in the drawings; rather, the skilled person will recognize that many changes and modifications may be made within the scope of the appended claims.

The invention claimed is:

1. An electric machine drive arrangement for a heavy-duty road vehicle, comprising:
   an electric machine;
   a brake arrangement connected to the electric machine; and
   a braking resistor controller configured to control the brake arrangement, wherein the braking resistor controller has a primary power feed connection and a back-up power feed connection, and wherein the back-up power feed connection is directly connected to an alternating current (AC) side of the electric machine for the electric machine to supply back-up power to the braking resistor controller.

2. The electric machine drive arrangement of claim 1, wherein the back-up power feed connection is directly connected to the AC side of the electric machine via an auxiliary low voltage power supply interconnected between the AC side of the electric machine and the back-up power feed connection.

3. The electric machine drive arrangement of claim 2, wherein the auxiliary low voltage power supply comprises a rectifier for rectifying AC voltage supplied from the AC side of the electric machine to a direct current (DC) voltage that is provided to the back-up power feed connection.

4. The electric machine drive arrangement of claim 2, wherein the auxiliary low voltage power supply comprises a buck converter.

5. The electric machine drive arrangement of claim 2, wherein the auxiliary low voltage power supply comprises a capacitor arranged for voltage stabilization.

6. The electric machine drive arrangement of claim 2, wherein the auxiliary low voltage power supply comprises a low voltage stabilizer.

7. The electric machine drive arrangement of claim 2, wherein the electric machine drive arrangement further comprises:

an electric machine controller configured to control the electric machine, and wherein the electric machine controller comprises a power feed connection connected to the auxiliary low voltage power supply for the auxiliary low voltage power supply to supply power to the electric machine controller.

8. The electric machine drive arrangement of claim 1, wherein the brake arrangement comprises a braking resistor circuit.

9. The electric machine drive arrangement of claim 8, wherein the braking resistor circuit is a braking resistor.

10. The electric machine drive arrangement of claim 8, wherein the braking resistor circuit is an electrical motor connectable to a mechanical brake circuit.

11. The electric machine drive arrangement of claim 8, wherein the braking resistor circuit is connectable to a control circuit.

12. The electric machine drive arrangement of claim 1, wherein the electric machine drive arrangement further comprises:

a motor drive system inverter with an AC side for interfacing with the electric machine.

13. The electric machine drive arrangement of claim 12, wherein the brake arrangement is connected in a parallel circuit to the motor drive system inverter on a direct current (DC) side of the motor drive system inverter.

14. The electric machine drive arrangement of claim 12, wherein the electric machine drive arrangement further comprises:

a rectifier arrangement connected in parallel between the brake arrangement and the motor drive system inverter on the AC side of the motor drive system inverter.

15. A road vehicle comprising the electric machine drive arrangement of claim 1.

* * * * *